United States Patent

[11] 3,571,718

[72] Inventor Joseph A. Worcester
Frankfort, N.Y.
[21] Appl. No. 709,307
[22] Filed Feb. 29, 1968
[45] Patented Mar. 23, 1971
[73] Assignee General Electric Company

[54] SQUELCH CIRCUIT
6 Claims, 2 Drawing Figs.

[52] U.S. Cl. .......... 325/478,
325/402, 325/403, 325/478, 325/348
[51] Int. Cl. .......... H04b 1/10
[50] Field of Search .......... 325/478, 470, 348, 341, 319, 473, 402, 403, 408—411; 179/15 (ST); 328/165; 340/171

[56] References Cited

UNITED STATES PATENTS

| | | | |
|---|---|---|---|
| 2,840,699 | 6/1958 | Carpenter .......... | 325/478 |
| 3,079,558 | 2/1963 | Spencer .......... | 325/478 |
| 3,126,449 | 3/1969 | Shirman .......... | 340/171 |
| 3,430,147 | 2/1969 | Hennessey et al. .......... | 325/402 |
| 3,196,354 | 7/1965 | Engelbrecht .......... | 325/478 |

FOREIGN PATENTS

| | | | |
|---|---|---|---|
| 781,582 | 8/1957 | England .......... | 325/478 |
| 1,061,393 | 7/1959 | Germany .......... | 325/348 |

*Primary Examiner*—Robert L. Griffin
*Assistant Examiner*—Albert J. Mayer
*Attorneys*—W. J. Shanley, Frank L. Neuhauser, Oscar B. Waddell, Marvin A. Goldenberg and Joseph B. Forman

ABSTRACT: A radio receiver including a squelch circuit having a unilateral conducting element normally biased for nonconduction connected between the detector and audio amplifier stages. An integrating circuit is connected between the detector output and an output terminal of the unilateral conducting element. Upon appearance of a detected audio signal at the detector output, the integrating circuit develops a biasing potential at the output terminal of the element. When the magnitude of the bias produced by the integrating circuit exceeds the level necessary to maintain the unilateral conducting element in a nonconducting state, the element conducts, and the audio signal is coupled to the audio amplifier input.

INVENTOR:
JOSEPH A. WORCESTER,
BY W. S. Wolfe
HIS ATTORNEY.

SQUELCH CIRCUIT

BACKGROUND OF THE INVENTION

This invention relates to squelch circuits for inclusion in radio receivers and the like. More specifically, it relates to squelch circuits which operate in response to the integrated signal level rather than to the peak level of the signal.

Squelch circuits are used in many AM radio applications for muting a receiver in the absence of incoming signals. Squelch circuits may be included in AM broadcast receivers so that an operator need not listen to band noise while tuning between stations, and may also be used in citizens' band communications receivers for silencing during standby operation.

In one type of squelch circuit, a controlled device conducts the output of a receiver detector to the receiver audio amplifier input. A DC squelch bias is applied to the controlled device, the bias being adjusted to render the device nonconducting when no incoming signal is present. Since no input is delivered to the audio amplifier, the receiver is muted. When a signal is received, a DC control voltage is derived from the signal and utilized to overcome the squelch bias so that the device becomes conductive. In this manner, the squelch circuit operates in response to a signal to apply that signal to the amplifier input and the receiver is rendered operative.

Undesirable noise appears in various forms. Band noise including noise of an impulse character may be present external to the receiver. In addition, noise may be internally generated in stages of the receiver prior to the stage in which a control DC voltage is derived from the incoming signal. In this situation, noise will produce a DC bias proportional to its peak value which tends to overcome the squelch bias. Thus, it is necessary to adjust the squelch bias to a sufficient level such that the bias will not be overcome by the strongest undesired noise which may be present over an extended period of time. In this manner, the squelch circuit may be prevented from operating in the presence of strong noise. However, the squelch circuit is thereby prevented from operating in the presence of intelligence-modulated signals which may be weaker than ambient noise levels.

In typical cases, the integrated level of internally generated noise is only one-fourth of its peak level, and the integrated level of external noise of an impulse nature is only one-hundredth of its peak level. Thus, if a receiver were provided including a squelch circuit that operated in response to integrated rather than peak signal levels, a much lower squelch bias could be used to mute the receiver in the presence of noise. The squelch circuit could be operated by weaker signals, and the receiver would hence be more sensitive to incoming signals.

It is therefore an object of the present invention to provide a squelch circuit in a radio receiver which operates in response to the integrated level of received signals rather than to peak levels of received signals.

Various prior art arrangements have been devised to circumvent the disadvantage of a squelch circuit in which a predetermined bias must be overcome by an intelligence-modulated signal having a greater peak value than that of ambient noise. An example of such arrangements is a circuit which is responsive to signal-to-noise ratio for rendering a receiver amplifier operative only when the signal-to-noise ratio is favorable for reception. This arrangement, however, lacks simplicity in operation and construction.

It is therefore also an object of the present invention to provide a squelch circuit of the type described which is simple and inexpensive in construction.

SUMMARY OF THE INVENTION

Briefly stated, in accordance with the present invention, there is provided a squelch circuit which controls the conduction of a unilateral conducting device, e.g. a diode connected between the output of a detector and the input of an audio amplifier. The unilateral conducting device is controlled in response to the integrated value of incoming signals. The element is normally biased to a nonconducting state. When a signal is received, an integrating network coupled to the detector produces a DC control voltage which is used to overcome the squelch bias and render the element conductive. When the element is rendered conductive, the audio signal is coupled from the detector output to the audio amplifier input.

BRIEF DESCRIPTION OF THE DRAWINGS

The foregoing objects and novel features which characterize the present invention are pointed out with particularity in the appended claims. The present invention, both as to its organization and manner of operation, as well as its best mode of operation, may be further understood by reference to the following description in conjunction with the following drawings.

Of the drawings:

FIG. 1 reveals a superheterodyne receiver in which stage 1, wherein selection and conversion are accomplished in conventional fashion, delivers an intermediate frequency signal to detector and squelch circuit 2. The output of the circuit 2 is coupled to an audio amplifier and output stage 3. An intermediate frequency (IF) transformer 10 couples the output of stage 1 to diode detector 11. Any suitable detector may be used, however, a simple diode detector is most convenient for application in a superheterodyne receiver circuit. In this embodiment, the diode detector 11 is poled to produce a positive half-wave output.

Figure 1:
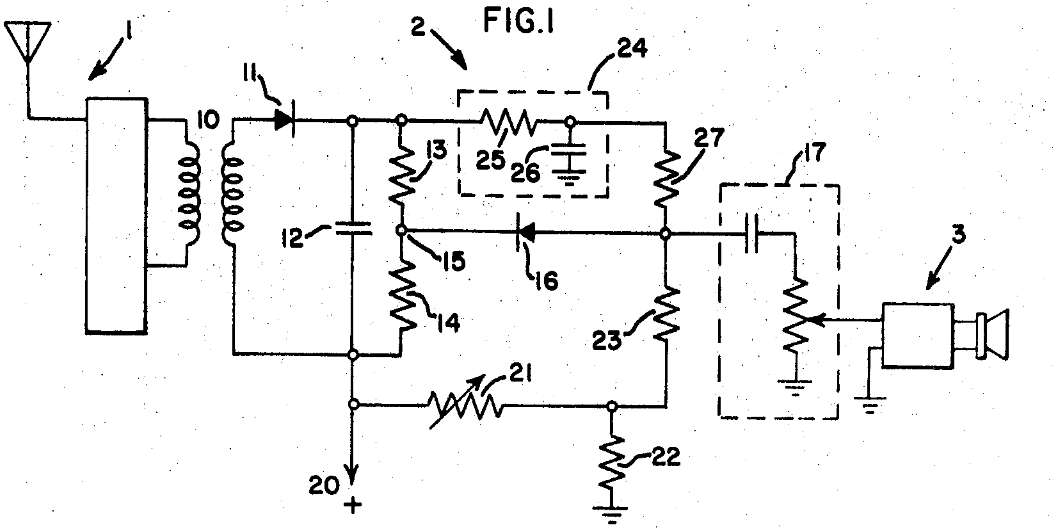
FIG. 1 is a schematic representation of an apparatus constructed in accordance with the present invention.

The detector output appears at the cathode of diode 11. Bypass capacitor 12 and series-connected load resistors 13 and 14 are connected across the detector 11 and the secondary of transformer 10. Diode 16, which is the squelch element, has its cathode, which comprises its input terminal, connected to the junction 15 of serially connected resistors 13 and 14. The anode of diode 16, which comprises its output terminal, is connected to a coupling circuit 17 which includes a capacitor, connected in series with a potentiometer, for coupling the squelch circuit 2 to audio amplifier and output stage 3.

The detected audio signal appears at junction 15. When diode 16 is in a conducting state, it conducts the signal to the audio amplifier input 17, so that the audio amplifier and output stage 3 deliver a signal to the receiver loudspeaker. When diode 16 is nonconducting, no signal is delivered to the audio amplifier output, and the receiver is muted.

Squelch bias is provided by a positive DC source 20. Source 20 is connected to resistor 14 to apply a positive bias to the cathode of diode 16. Source 20 is also connected to a squelch control resistor 21, which is coupled to the anode of diode 16 by resistor 23. Resistor 22 is connected between ground and the junction of resistors 21 and 23. The value of resistor 21 is chosen so that the potential applied to the anode of diode 16 is negative with respect to the potential applied to the cathode. Thus, the diode is normally nonconductive. The potential between the anode and cathode of the diode is the squelch bias which must be overcome by incoming signals to render the receiver operative. In order to provide for an adjustable squelch bias, resistor 21 may be made variable.

An integrating circuit 24 comprising resistor 25 and capacitor 26 couples the positive DC potential developed across load resistors 13 and 14 upon detection of a signal to the anode of diode 16 via the resistor 27. Audio variations are removed from this potential by the circuit 24.

In analyzing the operation of the circuit, the case in which no incoming signal is present in the stage 1 is considered first. The squelch bias supplied from source 20 is connected to the diode 16 through resistor 14 and resistors 21 and 23. As explained above, the potential applied to the cathode of the diode 16 is positive with respect to the potential supplied to the anode of diode 16 so that the diode 16 is normally nonconducting.

When a signal is received, it is coupled to the detector diode 11 by IF transformer 10. The diode 11 produces a positive half-wave output in response to the incoming signal. Bypass capacitor 12 removes IF frequency components from the audio input signal, and the detected audio signal appears at point 15. The audio signal is applied to the cathode of the squelch diode 16. A positive DC potential is developed across the diode load resistors 13 and 14. This potential is integrated and applied to the anode of diode 16 by the integrating network 24 so that the potential at the anode is raised with respect to the potential at the cathode. When the potential applied to the cathode by the integrating circuit exceeds the squelch bias, the squelch bias is overcome, and the diode 16 conducts. The detected audio signal is then conducted from the anode of diodes 16 to the audio amplifier input circuit 17.

The polarity of the audio signal appearing at point 15 applied to the cathode of diode 16 is positive, and the signal would render the diode nonconducting if not for the greater positive potential applied to the anode of diode 16 through the integrating circuit 24. The resistors 13 and 14 may be so proportioned that in the event noise impulses are received having an amplitude exceeding the peak value of a signal modulated at a predetermined level, the magnitude of the positive potential derived from the detector output and appearing at point 15 will be sufficient to turn the diode off. Thus, noise limiting is achieved. For most communications purposes, it is desirable to set this level at the equivalent of 100 percent modulation.

This arrangement is advantageous in muting the receiver in the presence of various forms of noise. For example, it may be desired to mute the receiver in the presence of noise generated in the input stage of the receiver. In a typical case, the peaks of such noise are four times as high as the integrated potential which the noise produces. In the present circuit, the squelch bias level need only be high enough to prevent the integrated rather than the peak signal from operating the circuit, and the amplitude of a potential produced in response to a signal need only be high enough to overcome this squelch level. Consequently, the present squelch circuit will be four times as sensitive to intelligence-modulated signals as one which operates in response to peak potentials. External noise peaks are often of high amplitude and short duration. The integrated value of such noise peaks may be only one-hundredth the peak value. In this case, the present circuit provides a 100 to 1 sensitivity advantage.

Figure 2:
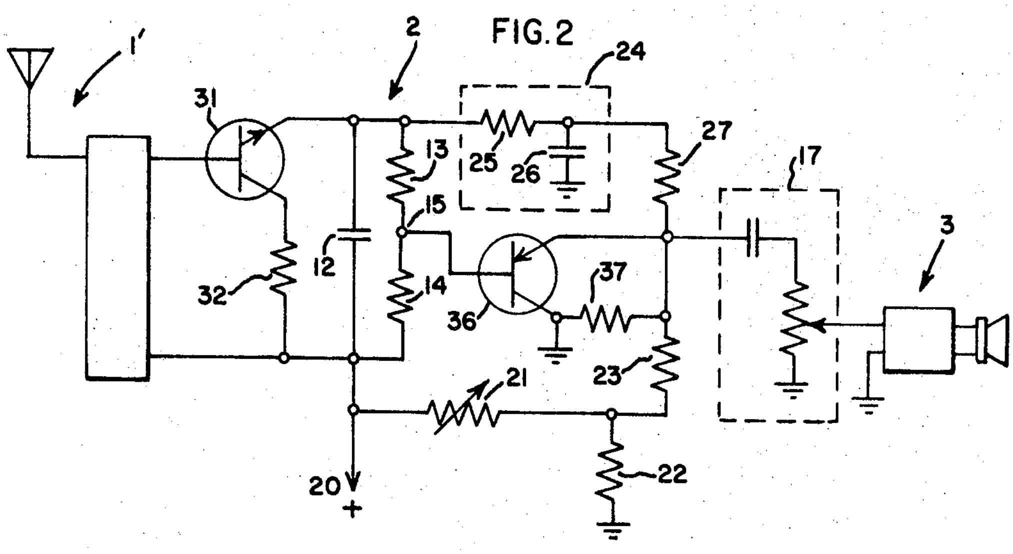
FIG. 2 is a schematic representation of another embodiment constructed in accordance with the present invention.

FIGURE 2 reveals a radio receiver in which a stage 1′ couples a selected signal to transistor detector 31 included in a detector and squelch circuit 2. The circuit 2 is coupled to audio amplifier and output stage 3. The same reference numerals are used to denote elements which correspond to and perform the same functions as elements shown in FIGURE 1.

The base-collector circuit of NPN transistor 31 is connected across the output of stage 1′. The collector of transistor 31 is coupled to positive source 20 through resistor 32. As in the circuit shown in FIG. 1, the detector 31 operates to produce a positive half-wave output when an incoming signal is received. This output appears at the emitter of transistor 31. The squelch element comprises a PNP transistor 36, rather than a diode as in the embodiment of FIG. 1. The base transistor 36 is connected to junction 15, and the emitter is connected to audio amplifier 3 via coupling circuit 17. The collector of transistor 36 is connected to ground and also coupled to the source 20 through resistors 37, 23 and 21.

The circuit shown in FIGURE 2 operates in a manner similar to the circuit shown in FIG. 1. A squelch bias is applied to the emitter of transistor 36 so that the emitter is negative with respect to the base. When signal is received, the detector 31 produces a positive half-wave output. The detected audio signal is applied to the base of transistor 36, and an integrated DC potential is applied to the emitter to overcome the squelch bias. When the squelch bias is overcome, transistor 36 conducts, and the audio signal is conducted from the emitter of transistor 36 to the audio amplifier 3 via coupling circuit 17.

Many modifications may be made in the specific circuit details of this invention without departing from the scope thereof as defined in the appended claims. For example, the polarity of diodes 11 and 16 of the circuit of FIG. 1 may be reversed and source 20 made negative. Similarly, in the circuit shown in FIG. 2, NPN transistor 31 may be replaced with a PNP transistor, PNP transistor 36 may be replaced with an NPN transistor, and source 20 may be made negative.

I claim:

1. In a radio receiver including an operatively coupled detector and squelch circuit, means for coupling said detector and squelch circuit between a signal selection stage and an audio amplifier stage, said detector producing an output of a given polarity upon reception of a signal, a unilateral conducting device having an input terminal and an output terminal, means for coupling a portion of the output of said detector to said input terminal of said unilateral conducting device, means for coupling said output terminal of said unilateral conducting device to said audio amplifier stage, the improvement comprising:

a. means connected to said unilateral conducting device for biasing said unilateral conducting device to a nonconducting state in the absence of a signal in said signal selection stage:

b. an integrating network having an input terminal and an output terminal, said input terminal of said integrating network coupled to said detector output and said output terminal of said integrating network coupled to said unilateral conducting device for biasing said unilateral conducting device to a conducting state upon reception of a signal.

2. The receiver as defined in claim 1 in which:

a. the output terminal of said integrating circuit is connected to the output terminal of said unilateral conducting device; and said means for biasing said unilateral conducting device to a nonconductive state comprises:

b. a unidirectional potential source having the same polarity as the output of said detector;

c. a resistance connected between the input terminal of said unilateral conducting device and said unidirectional potential source; and d. a resistance connected between the output terminal of said unilateral conducting device and said unidirectional potential source, the values of said resistance being chosen so that the potential applied to said input terminal exceeds the potential applied to said output terminal.

3. The receiver as defined in claim 2 in which said resistance connected between said unidirectional potential source and said output terminal of said unilateral conducting device is variable.

4. A receiver as defined in claim 2 in which said unilateral conducting device comprises a diode.

5. A receiver as defined in claim 2 in which:

a. said means coupling a portion of the output of said detector to the input of said unilateral conducting device comprises a first and a second load resistor connected in series across the output of said detector;

b. said input terminal of said unilateral conducting device is connected to the junction of said first and second load resistors; and c. said load resistors are proportioned so that when noise impulse in excess of a predetermined level are received, a bias is applied to the input of said unilateral conducting device sufficient to bias said unilateral conducting device to a nonconducting state.

6. A receiver as defined in claim 5 in which said unilateral conducting device comprises a diode.